(12) United States Patent
Edlinger

(10) Patent No.: US 6,803,016 B2
(45) Date of Patent: Oct. 12, 2004

(54) DEVICE FOR ATOMIZING AND GRANULATING LIQUID SLAGS

(75) Inventor: Alfred Edlinger, Bartholomäberg (AT)

(73) Assignee: Tribovent Verfahrensentwicklung GmbH, Loruns (AT)

( * ) Notice: Subject to any disclaimer, the term of this patent is extended or adjusted under 35 U.S.C. 154(b) by 6 days.

(21) Appl. No.: 10/070,529

(22) PCT Filed: May 28, 2001

(86) PCT No.: PCT/AT01/00168

§ 371 (c)(1),
(2), (4) Date: Mar. 6, 2002

(87) PCT Pub. No.: WO02/04687

PCT Pub. Date: Jan. 17, 2002

(65) Prior Publication Data

US 2002/0135110 A1 Sep. 26, 2002

(30) Foreign Application Priority Data

Jul. 7, 2000 (AT) ........................ A 1168/2000

(51) Int. Cl.⁷ ............................................... C22B 7/04
(52) U.S. Cl. .......................... 266/201; 241/65; 264/12; 425/7
(58) Field of Search ............................ 266/201; 241/65; 264/12; 425/7

(56) References Cited

U.S. PATENT DOCUMENTS

| | | | |
|---|---|---|---|
| 2,402,441 A | 6/1946 | Paddle | |
| 2,450,978 A | 10/1948 | Meinzer | |
| 3,891,730 A | 6/1975 | Wessel et al. | |
| 6,318,123 B1 * | 11/2001 | Edlinger | ................. 65/19 |

FOREIGN PATENT DOCUMENTS

| | | | |
|---|---|---|---|
| DE | 40 19 563 A1 | 12/1991 | ............. B22F/9/08 |
| GB | 1413284 | 11/1975 | ........... B22D/23/08 |
| LU | 81385 | 2/1981 | |
| WO | WO 99/42623 | 8/1999 | ............. C21B/3/08 |
| WO | WO 00/32306 | 6/2000 | ............. B01J/2/04 |

* cited by examiner

*Primary Examiner*—Melvyn Andrews
(74) *Attorney, Agent, or Firm*—Chapman and Cutler LLP

(57) ABSTRACT

In a device for atomizing and granulating liquid oxidic slags such as, e.g., converter slags, blast furnace slags or waste incineration slags, including a slag tundish having an outlet opening into which a height-adjustable lance for a propellant jet opens and to which a cooling chamber is connected, the outlet opening is surrounded by an immersion tube arranged concentrically therewith while forming an annular gap. A guide body capable of being adjusted in the axial direction of the lance is arranged in the region of the nozzle mouth of the propellant jet lance, which guide body deflects the propellant jet in the radial direction.

29 Claims, 1 Drawing Sheet

DEVICE FOR ATOMIZING AND GRANULATING LIQUID SLAGS

Figure 1:
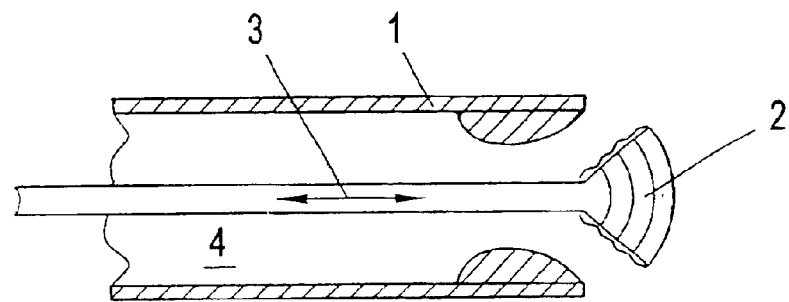

The invention relates to a device for atomizing and granulating liquid oxidic slags such as, e.g., converter slags, blast furnace slags or waste incineration slags, including a slag tundish having an outlet opening into which a height-adjustable lance for a propellant jet opens and to which a cooling chamber is connected, said outlet opening being surrounded by an immersion tube arranged concentrically therewith while forming an annular gap.

From AT 406 262 B a method for spraying oxidic slags became known, in which liquid slag was ejected from a tundish via a tundish tube, wherein a lance was introduced into the liquid slag to inject a propellant gas and, in particular, water vapor. The tundish tube provided in the slag outlet of the tundish as illustrated in AT 506 262 B could also be designed in the manner of a Laval nozzle, whereby vapor flow velocities in the supersonic range were observed, too, both due to the supercritical conditions under which hot vapor or water vapor was supplied and due to the subsequent possibility of a rapid expansion. In that known device a slag melt having temperatures of between about 1300° and 1500° C. was, thus, ejected using hot vapor as a propellant, rapid cooling having been effected subsequently within the cooling chamber by the reaction of carbon or carbon carriers with water vapor and the slag heat to carbon monoxide and $H_2$, thus providing reducing conditions. The propellant vapor jet tube was oriented coaxially with the tundish outlet opening. In principle, such a device allows for only limited controlling options and, in particular, involves an extremely high consumption of propellant gas as well an extremely high consumption of coolant with a high amount of gas being required and a high amount of gas being formed said by reaction.

From WO 00/32306 it became known, in addition, to conduct an immersion tube or throttle tube concentrically with the tundish outlet in an immersed manner, the lower edge of that throttle tube having been mounted so as to be adjustable in the height direction. By means of such a throttle tube, it was feasible to appropriately adjust the thickness of the jacket of the tubularly emerging slag jet, yet the propellant jet was substantially injected in a axial direction also there. By the aid of the throttle tube, the direct immersion of the lance into the slag could, however, be avoided, since the propellant jet lance was guided in the interior of the throttle tube. The comminution forces in such a configuration basically enter into effect as shearing forces by a substantially axially directed propellant jet with an appropriate viscosity inducing an acceleration, and hence appropriate shearing forces, after its expansion in the interior of the liquid slag jacket concentrically surrounding said propellant jet. Since the viscosity of gases increases at increasing temperatures, extremely hot vapor was used to ensure high shearing forces and hence an adequate comminution effect. The comminution performance could even be enhanced in that the throttle tube was designed to be closed by a lid and a throttled gas-feed duct ran into the throttle tube. On account of suitable pressure conditions developing within the annular space provided around the lance, resonance effects could be utilized while obtaining accordingly pulsating jets with periodic pressure bursts, thus improving droplet comminution.

Since the shearing forces enter into effect primarily because of the axial acceleration, the consumption of propellant is relatively high, and the overall structural height of the device is relatively large, also in that embodiment.

The invention aims to improve a device of the initially mentioned kind to the extent that a substantially reduced propellant gas feed will do while, at the same time, an enhanced comminution performance leading to even finer particle sizes is ensured in a substantially shorter-structured device. To solve this object, the device according to the invention essentially consists in that a guide body capable of being adjusted in the axial direction of the lance is arranged in the region of the nozzle mouth of the lance for the propellant jet, which guide body deflects the propellant jet in the radial direction. By arranging a guide body capable of being adjusted in the axial direction of the lance in the region of the nozzle mouth of the lance it is feasible to deflect the propellant jet from a substantially axial direction into a more or less radial direction, thus substantially reducing the free distance until its impingement on the slag jacket. The device advantageously may be operated in a manner that the propellant jet is fed under supercritical conditions so as to cause its rapid expansion after having left the nozzle, by which the propellant jet is accelerated to supersonic speed. Such a propellant jet accelerated to supersonic speed will then collide with the liquid jacket of the outflowing slag already after an extremely short distance, thus ensuring a particularly efficient comminution performance.

An essential criterion for the proper functioning of a device of this kind resides, of course, in the control of the solidification and corrosion processes in order to adequately observe the respectively desired parameters relating to the geometry of the jet and the thickness of the emerging slag jacket. The used slags and, in particular, converter slags, as a rule, are characterized by relatively high iron oxide contents, thus involving considerable refractory problems. A suitable protection of the structural components that get into contact with such slags may usually be obtained only by the formation of a precisely defined slag pelt, to which end various ways of adjustment and setting must be made available in order to safely control also the growth of such a slag pelt to the minimum extent desired. Due to the relatively fine comminution provided by the semi-radially directed propellant gas jets impinging on the slag jacket at supersonic speed, it is to be considered further that, in addition to the physical comminution, also chemical processes occur in an accelerated manner on account of the relatively large specific surfaces of these small solidifying particles. As already proposed, particularly rapid cooling is feasible by the chemical reaction of the hot slag jet and the propellant vapor with carbon carriers such as, for instance, hydrocarbons, thus forming carbon monoxide and hydrogen.

Due to the small particle size, a relatively large portion of iron powder having an extremely small particle size is, thus, formed in the product obtained such that operation should be continued under reducing conditions also for this reason in order to avoid the spontaneous ignition of such most finely distributed iron particles. These most finely distributed iron particles, or iron powder, in turn, constitute a high-quality product, which will substantially enhance the economy of the method if successfully discharged without involving any risk of reoxidation. Advantageously, the method according to the invention is, therefore, controlled to proceed in a reducing manner, wherein the configuration of a device suitable for that purpose advantageously is devised such that coolant outlets which are directed radially inwards are arranged concentric with the slag jet in the region of the outlet opening or immediately following the outlet opening. Such additional radially inwardly directed coolant outlets allow the device to be operated in a manner that also the coolant is supplied under supercritical conditions so as to rapidly expand, and also accelerate to supersonic speed, after having left the nozzle. The substantially tubular slag jacket emerging from the tundish, thus, is powered in the radial direction not only from inside by the propellant jet particles expanding at supersonic speed, but also from outside by the coolant particles expanding at supersonic speed, so that a particularly efficient comminution with simultaneous cooling under the formation of particularly fine particles will be ensured. Due to the relatively short distance over which both the propellant jet and the coolants enter into a combined action with the solidifying slag jet, and due to the extremely efficient cooling effect, both the overall amount of the injected propellant jet and the overall amount of coolant may be substantially reduced such that smaller gas amounts are introduced and smaller gas amounts are formed by chemical reactions. Immediately after the extremely fine atomization caused by the interaction with the jet accelerated to supersonic speed a reduction cloud is formed, in which the gas volume rises substantially as hydrocarbons and water vapor are reacted to twice the volume amount of carbon monoxide and hydrogen.

By supplying the coolant in the immediate vicinity of, or even directly within, the slag outlet, it is, at the same time, feasible to have the cooling of these structural components controlled in a suitable manner so as to minimize their wear. To this end, the configuration advantageously is devised such that the slag outlet opening is designed as a torus-shaped ring to whose annular cavity a coolant supply duct and the radially inwardly directed coolant outlets are connected.

A particularly small-structured device may be obtained in the context of the device according to the invention in that the propellant jet nozzle and/or the coolant outlets are designed as Laval nozzles and the guide body arranged in the propellant jet nozzle leaves a clear cross section relative to the nozzle mouth, which widens in the direction of ejection of the propellant jet. The use of Laval nozzles for the nozzle mouth of the lance as well as the simultaneous use of Laval nozzles in the region of the coolant outlets renders feasible, already very briefly after the emergence of the respective media, the attainment of supersonic speed such that particularly short clear distances will suffice to safeguard the respective comminution effect upon impingement on the slag jet.

In this case, the configuration advantageously is devised such that the pressure of the coolant is adjusted to be higher than the pressure of the propellant jet, whereby it is, at the same time, ensured that the expanding propellant jet collides with solidifying particles already in the zone of impingement on the liquid slag jacket. These particles which are just solidifying exhibit a low mechanical stability, and it could be surprisingly found that the comminuted product has smaller grain sizes than would result from the comminution of a liquid slag jet, whose droplet size is substantially influenced by the surface tension.

A jet of combustion off-gases and vapor is advantageously used as said propellant jet while, furthermore, gaseous hydrocarbons are advantageously used as said coolant. When using these media, it is ensured at a comparatively low pressure that supercritical conditions and hence underexpanded media are fed to the respective nozzle, whereupon a rapid and vigorous expansion will subsequently occur so as to attain the desired supersonic speeds. The condensation of water from a propellant jet comprised of combustion off-gases and water vapor at a substoichiometric combustion results directly in a reducing gas ($CO+H_2$, balance $CO_2$) which may be reused as a burning gas, preventing the reoxidation of iron powder. In any event, the configuration advantageously is devised such that the propellant medium and/or the coolant are fed to the nozzles under supercritical pressure.

As already pointed out in the beginning, an adjustability to the respectively selected medium as far as possible, which is aimed to control both the cooling parameters and the comminution parameters, is essential to the economy of the method realized by a device of this type, which is especially easy to implement, in particular, on account of the propellant jet guide body capable of being adjusted in the axial direction of the lance. In this context, the configuration advantageously is devised such that the guide body, on its jacket defining the nozzle cross section, carries guide surfaces, in particular curved guide surfaces, having semi-radial or tangential courses.

Bearing in mind the extremely small solidified particles formed, and bearing in mind that with such a device it is usually operated successfully under reducing conditions if accordingly small structural dimensions are to be achieved, it has to be safeguarded that the extremely fine iron powder particles are separated as soon as possible in order to prevent reoxidation and optionally fire hazard. Such a separation is, however, feasible only if the Curie point is fallen below, and the configuration according to the invention may, therefore, advantageously be devised such that a magnetic separator is arranged within the cooling chamber or following thereupon. Such a magnetic iron powder having a comparatively high temperature naturally tends to reoxidation relatively easily. Since, in the main, reducing conditions do, however, prevail, it merely has to be taken care that such a metal powder is fed with inert gas as soon as it has been separated from the powdery slag mixture.

In order to adequately protect the propellant gas lance from excessive wear and to additionally ensure that the clear distance between the mouth of the propellant gas lance and the impingement of the jet on the liquid slag jacket is maintained as small as possible, the configuration advantageously is devised such that the nozzle mouth of the propellant jet lance is arranged above the lower edge of the immersion tube.

Overall, the propellant gas/vapor consumption may be reduced to 0.05–0.15 $Nm^3$/ton slag with a device of this type. Only slight cooling losses are observed, wherein, however, additional slag tundish heating may also be advantageous to control the growing slag pelt. The minimization of the propellant gas/vapor consumption in this case is achievable on the reduction of the free jet length and the gas exploitation attained by the guide body.

In general, propellant gas/vapor is used at temperatures of between 600° and 1250° C. and, like the coolant, within a pressure range of between 2 and 10 bars. Atomization may as well be effected in a substantially horizontal direction, whereby also an overpressure may be built up within the granulation or cooling chamber. On account of the extremely fine particles, a pneumatic conveying means or a screening means may be consecutively provided.

In the following, the invention will be explained in more detail by way of an exemplary embodiment schematically illustrated in the drawing. Therein, FIG. 1 is a cross sectional view through the end of a propellant gas lance, and FIG. 2 is a cross sectional view through the slag tundish with the tundish outlet and a propellant lance.

FIG. 1 depicts a propellant gas lance 1 whose outlet cross section widens in the manner of a Laval nozzle. A guide body 2 is arranged in the widening cross section so as to be displaceable in the axial direction of the lance, the sense of displacement being indicated by double arrow 3. The lance itself may be oriented horizontally or vertically, a propellant and, in particular, water vapor being feedable via the annular space 4 provided between the guide body and the lance.

Figure 2:
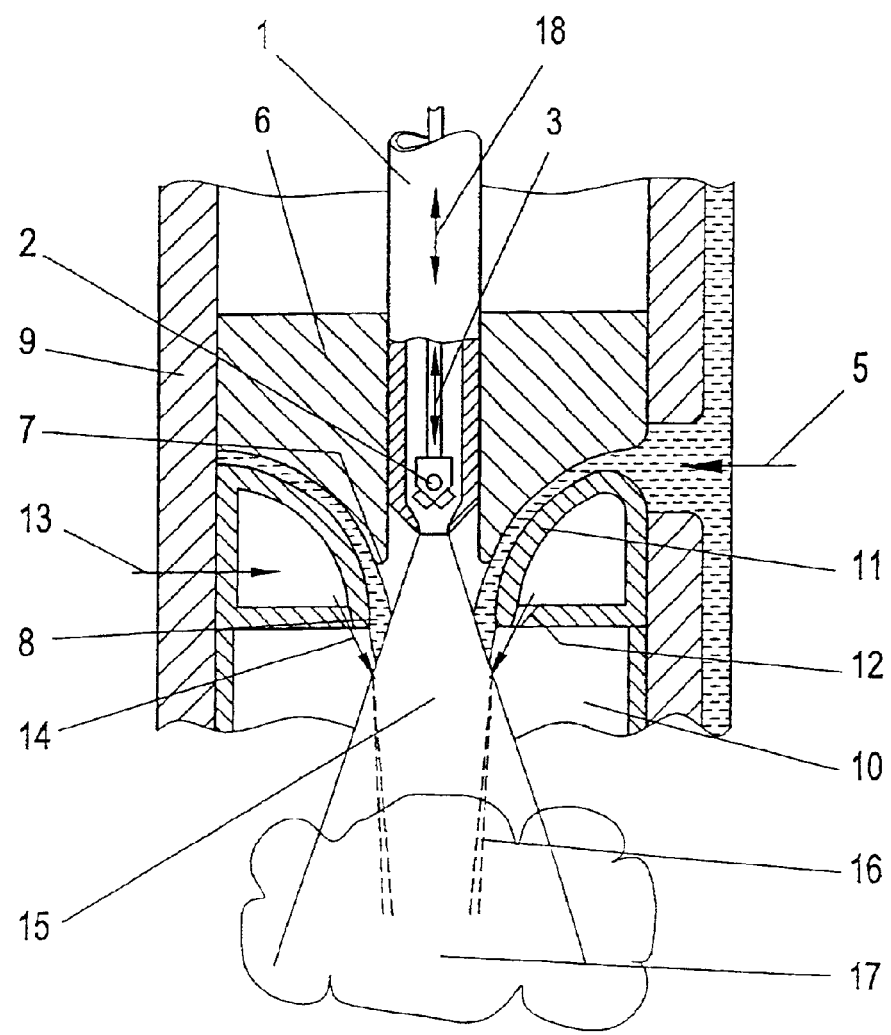

The mode of operation of the device is apparent in detail from FIG. 2. Liquid slag is discharged from a slag vessel into the slag tundish in the sense of arrow 5, whereby an immersion tube 6 is provided to precisely define a given wall thickness of an emerging slag jet, which immersion tube is designed like a die in the configuration according to FIG. A certain wall thickness of the liquid slag is defined between the lower edge 7 of this immersion tube or die 6 and the slag outlet opening 8 of the slag tundish 9, which subsequently exits into the consecutively arranged cooling or granulation chamber 10. The slag outlet comprises a torus-shaped hollow body 11 on whose lower end radially inwardly directed nozzles 12 are formed. Into the torus-shaped hollow body 11 are fed, via a duct 13, hydrocarbons emerging radially inwards in the sense of arrow 14.

The lance 1 is again arranged in the interior of the immersion tube 6 and the guide body 2 is mounted in its interior so as to be displaceable in the axial direction. The lance 1 itself is displaceable also in the axial direction in the sense of double arrow 18 so as to allow the geometry of the emerging propellant gas jet 15 to be adjusted within wide limits. With the configuration as a Laval nozzle, supersonic speeds are attained upon emergence of the jet, and the guide body causes the jet to widen rapidly such that the propellant jet 15 collides with the slag jacket 16, as do the inwardly oriented jets of the coolant nozzles 12. Since both of the jets are able to impinge at supersonic speed, a rapid and intensive comminution is reached with a cloud 17 forming subsequently, in which rapid cooling under a simultaneous rapid volume increase takes place due to the chemical decomposition of the cooling gas. The hydrocarbons of the coolant emerging in the sense of arrow 14 are thereby reacted to CO and $H_2$, said reaction with vapor leading to a doubling of the volume; since both media can be fed supercritically and, therefore, expand rapidly upon emergence from the nozzles, in particular the Laval nozzles, intensive comminution work and, at the same time, rapid cooling of the liquid slag, which leaves the slag outlet opening 8 as a tubular jacket, are ensured.

What is claimed is:

1. A device for atomizing and granulating liquid oxidic slags, comprising
  a slag tundish (2) having an a slag outlet opening (8),
  a height-adjustable lance (1) for a propellant jet, which opens into said slag outlet opening (8),
  a cooling chamber (10) is connected to said tundish,
  an immersion tube (6) arranged within said tundish, said immersion tube (6) arranged to surround said slag outlet opening, arranged concentrically with said slag outlet opening, and arranged to form an annular gap between said immersion tube (6) and said tundish, and
  a guide body (2) capable of being adjusted in the axial direction (3) of said lance (1), said guide body (2) being arranged in the region of a nozzle mouth of the lance (1) for the propellant jet (15), which guide body deflects the propellant jet (15) in the radial direction.

2. A device according to claim 1, further comprising coolant outlets (12) arranged to eject coolant into said cooling chamber (10), said coolant outlets (12) being directed radially inwards and arranged concentrically with a slag jet formed in the region of the slag outlet opening (8) or immediately following the slag outlet opening (8).

3. A device according to claim 1, wherein the slag outlet opening (8) is designed as a torus-shaped ring (11) having an annular cavity to which a coolant supply duct (13) and radially inwardly directed coolant outlets (12) are connected.

4. A device according to claim 2, wherein the slag outlet opening (8) is designed as a torus-shaped ring (11) having an annular cavity to which a coolant supply duct (13) and radially inwardly directed coolant outlets (12) are connected.

5. A device according to claim 1, wherein the propellant jet nozzle is designed as a Laval nozzle and the guide body (2) arranged in the propellant jet nozzle leaves a clear cross section relative to the nozzle mouth, which widens in the direction of ejection of the propellant jet.

6. A device according to claim 2, wherein the propellant jet nozzle is designed as a Laval nozzle and the guide body (2) arranged in the propellant jet nozzle leaves a clear cross section relative to the nozzle mouth, which widens in the direction of ejection of the propellant jet.

7. A device according to claim 3, wherein the propellant jet nozzle is designed as a Laval nozzle and the guide body (2) arranged in the propellant jet nozzle leaves a clear cross section relative to the nozzle mouth, which widens in the direction of ejection of the propellant jet.

8. A device according to claim 2, wherein the coolant outlets (12) are designed as Laval nozzles.

9. A device according to claim 3, wherein the coolant outlets (12) are designed as Laval nozzles.

10. A device according to claim 2, wherein the coolant outlets (12) are designed so that the pressure at the coolant ejected from the coolant outlets (12) is higher than the pressure of the propellant jet (15).

11. A device according to claim 3, wherein the coolant outlets (12) are designed so that the pressure of the coolant ejected from the coolant outlets (12) is higher than the pressure of the propellant jet (15).

12. A device according to claim 1, wherein said propellant jet comprises a jet of combustion off-gases and vapor.

13. A device according to claim 2, wherein said propellant jet comprises a jet of combustion off-gases and vapor.

14. A device according to claim 3, wherein said propellant jet comprises a jet of combustion off-gases and vapor.

15. A device according to claim 2, wherein said coolant comprises gaseous hydrocarbons.

16. A device according to claim 3, wherein said coolant comprises gaseous hydrocarbons.

17. A device according to claim 1, wherein the propellant jet is fed to the nozzle mouth of the lance (1) under supercritical pressure.

18. A device according to claim 2, wherein the propellant jet is fed to the nozzle mouth of the lance (1) under supercritical pressure.

19. A device according to claim 3, wherein the propellant jet is fed to the nozzle mouth of the lance (1) under supercritical pressure.

20. A device according to claim 2, wherein the propellant jet is fed to the nozzle mouth of the lance (1) under supercritical pressure, and the coolant is fed to the coolant nozzles (12) under supercritical pressure.

21. A device according to claim 1, wherein the guide body (2), on its surface defining the nozzle cross section, carries guide surfaces.

22. A device according to claim 2, wherein the guide body (2), on its surface defining the nozzle cross section, carries guide surfaces.

23. A device according to claim 1, further comprising a magnetic separator arranged within the cooling chamber (10) or following the cooling chamber (10).

24. A device according to claim 2, further comprising a magnetic separator arranged within the cooling chamber (10) or following the cooling chamber (10).

25. A device according to claim 1, wherein said immersion tube (6) has a lower edge (7) and the nozzle mouth of the propellant jet lance (1) is arranged above said lower edge (7) of the immersion tube (6).

26. A device according to claim 2, wherein said immersion tube (6) has a lower edge (7) and the nozzle mouth of the propellant jet lance (1) is arranged above said lower edge (7) of the immersion tube (6).

27. A device according to claim 21, wherein the guide surfaces are curved guide surfaces having semi-radial or tangential courses.

28. A device according to claim 22, wherein the guide surfaces are curved guide surfaces having semi-radial or tangential courses.

29. A device for atomizing and granulating liquid oxidic slags, comprising a slag tundish (9) having a slag outlet opening (8), a height-adjustable lance (1) for a propellant jet, which opens into said slag outlet opening (8), a cooling chamber (10) connected to said tundish, an immersion tube (6) arranged within said tundish, said immersion tube (6) arranged to surround said slag outlet opening, arranged concentrically with said outlet opening, and arranged to form an annular gap between said immersion tube (6) and said tundish, and a guide body (2) capable of being adjusted in the axial direction (3) of said lance (1), said guide body (2) being arranged in the region of a nozzle mouth of the lance (1) for the propellant jet (15), which guide body deflects the propellant jet (15) in the radial direction; and further comprising coolant outlets (12) arranged to whish eject coolant into said cooling chamber (10), said coolant outlets (12) being directed radially inwards and arranged concentrically with a slag jet formed in the region of the slag outlet opening (8) or immediately following the outlet opening (8);

a magnetic separator arranged within the cooling chamber (10) or following the cooling chamber (10); and wherein the slag outlet opening (8) is designed as a torus-shaped ring (11) having an annular cavity to which a coolant supply duct (13) and radially inwardly directed coolant outlets (12) are connected;

the propellant jet nozzle is designed as a Laval nozzle and the guide body (2) arranged in the propellant jet nozzle leaves a clear cross section relative to the nozzle mouth, which widens in the direction of ejection of the propellant jet;

the coolant outlets (12) are designed as Laval nozzles;

said propellant jet comprises a jet of combustion off-gases and vapor;

said coolant comprises gaseous hydrocarbons;

the propellant jet is fed to the nozzle mouth of the lance (1) under supercritical pressure, and the coolant is fed to the coolant nozzles (12) under supercritical pressure;

the guide body (2), on its surface defining the nozzle cross section, carries guide surfaces; and said immersion tube (6) has a lower edge (7) and the nozzle mouth of the propellant jet lance (1) is arranged above said lower edge (7) of the immersion tube (6).

* * * * *